Figure 1:
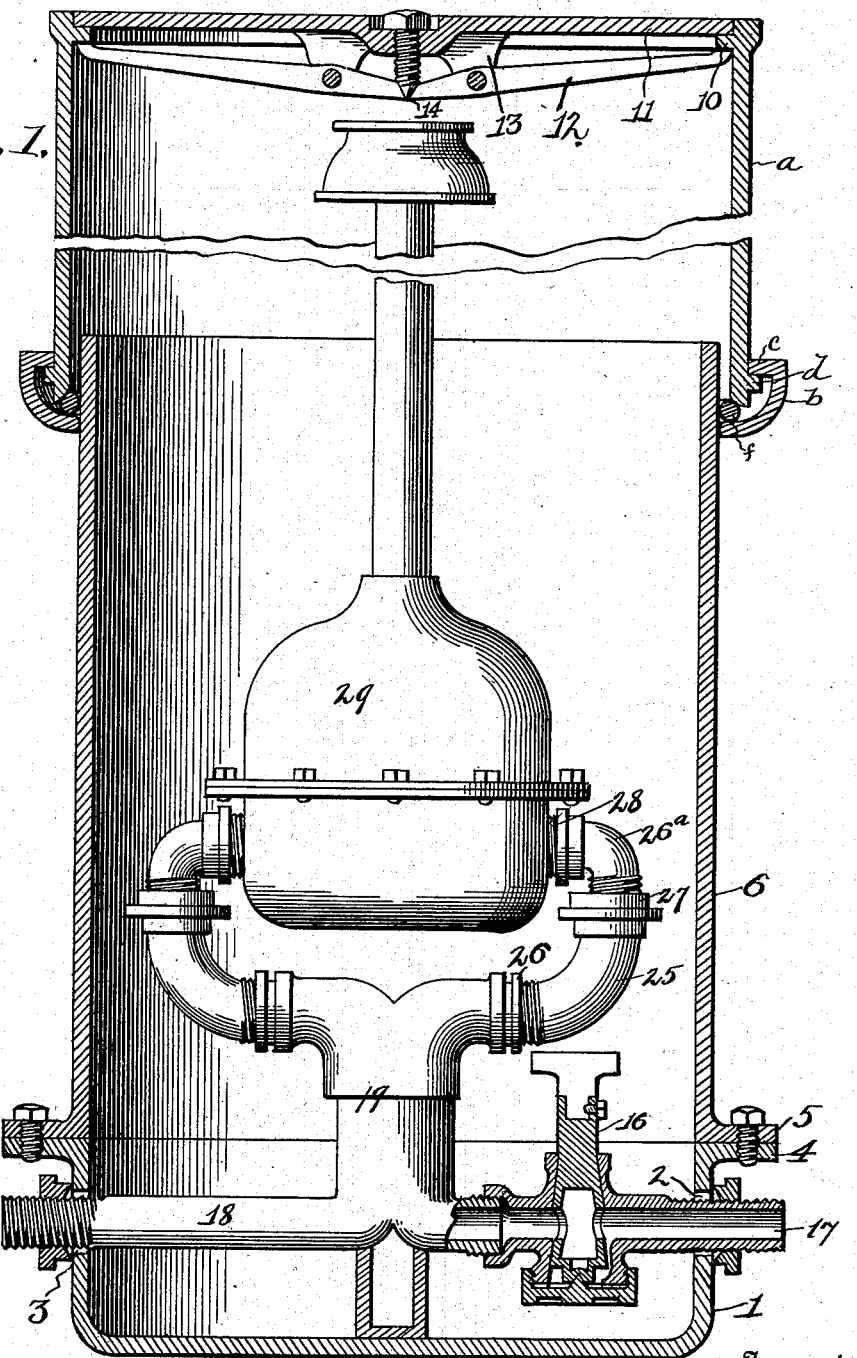

No. 654,615. Patented July 31, 1900.
H. V. ESTILL.
METER CONNECTION, METER AND STOP COCK BOX.
(Application filed Apr. 14, 1900.)
(No Model.) 3 Sheets—Sheet 1.

Witnesses

Inventor
Harry V. Estill
by Frank S. Appleman
Attorney

No. 654,615. Patented July 31, 1900.
H. V. ESTILL.
METER CONNECTION, METER AND STOP COCK BOX.
(Application filed Apr. 14, 1900.)
(No Model.) 3 Sheets—Sheet 2.

Witnesses
Inventor
Harry V. Estill
by Frank S. Appleman
Attorney

THE NORRIS PETERS CO., PHOTO-LITHO., WASHINGTON, D. C.

No. 654,615. Patented July 31, 1900.
H. V. ESTILL.
METER CONNECTION, METER AND STOP COCK BOX.
(Application filed Apr. 14, 1900.)
(No Model.) 3 Sheets—Sheet 3.
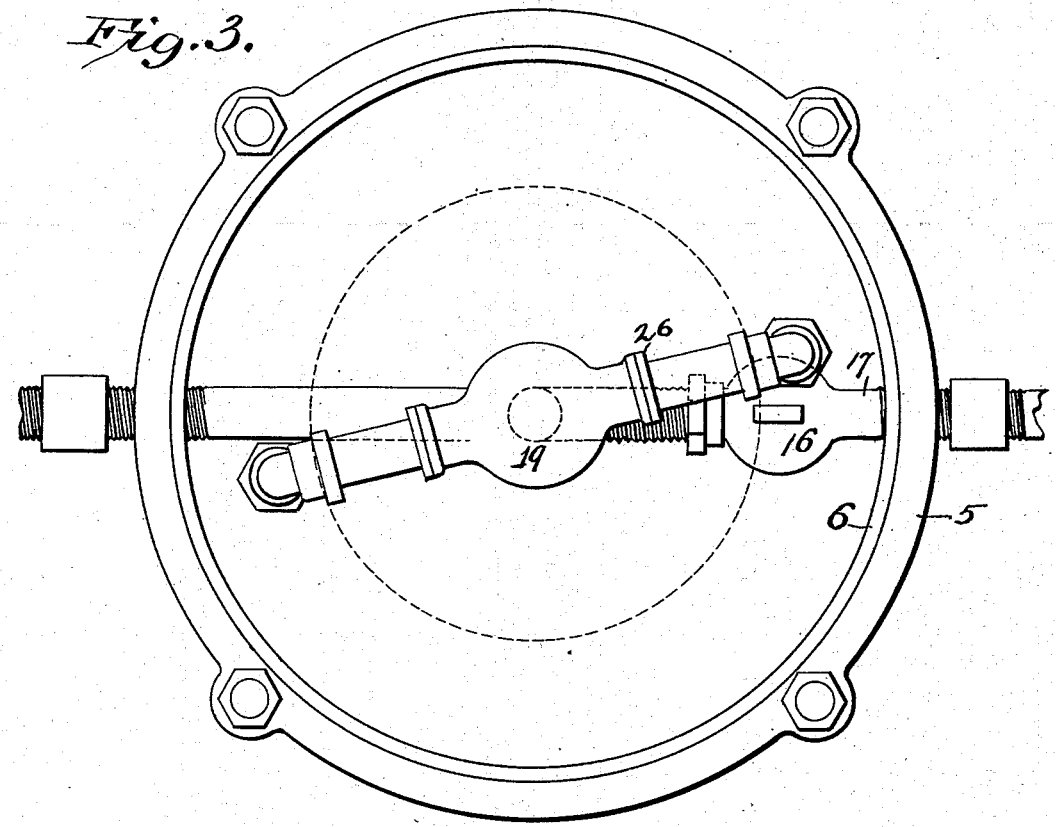
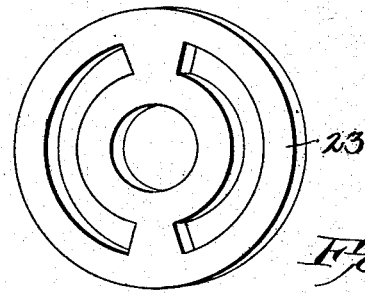
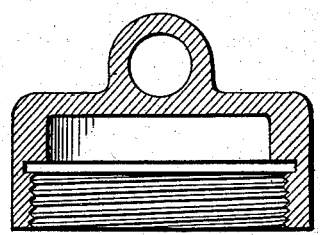
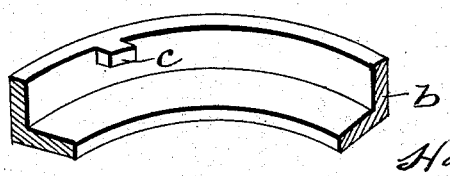
Witnesses
Inventor
Harry V. Estill
by Frank S. Appleman
Attorney

UNITED STATES PATENT OFFICE.

HARRY V. ESTILL, OF MOBERLY, MISSOURI.

METER CONNECTION, METER AND STOP-COCK BOX.

SPECIFICATION forming part of Letters Patent No. 654,615, dated July 31, 1900.

Application filed April 14, 1900. Serial No. 12,850. (No model.)

*To all whom it may concern:*

Be it known that I, HARRY V. ESTILL, a citizen of the United States of America, residing at Moberly, in the county of Randolph and State of Missouri, have invented certain new and useful Improvements in Meter Connections Meter and Stop-Cock Boxes, of which the following is a specification, reference being had therein to the accompanying drawings.

This invention relates to meter-boxes and meter connections embracing improvements on the invention covered by Patent No. 627,911, issued June 27, 1899.

One object of this invention is to provide means whereby a meter can be screwed on and off a service-pipe from the surface of the ground without disturbing the original connections; furthermore, to have a special meter connection of a novel construction having a central passage and an annular passage therearound which answers for both inlet or discharge, the same comprising a double coupling connected by screw-threads, thereby making a positive central connection.

A further object of the invention is to have an adjustable connection to suit all styles of meters and secured with a simple compression lock-nut.

A still further object of the invention is to provide a sectional meter-box telescopically connected and means for rendering the joints waterproof.

Furthermore, the object of the invention is to provide novel mechanism for retaining the cover in place, said mechanism being under the control of a single screw.

Furthermore, the object of the invention is the production of a meter connection of novel construction whereby, if desired, the meter may be removed and connection made to cause the supply and service pipes to communicate that the delivery to the service-pipe may not be permanently interrupted.

Finally, the object of the invention is to provide a meter-box and connections which will possess advantages in points of simplicity, efficiency, and durability, proving at the same time satisfactory in use and comparatively inexpensive to produce and sustain.

With the above and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Figure 2:
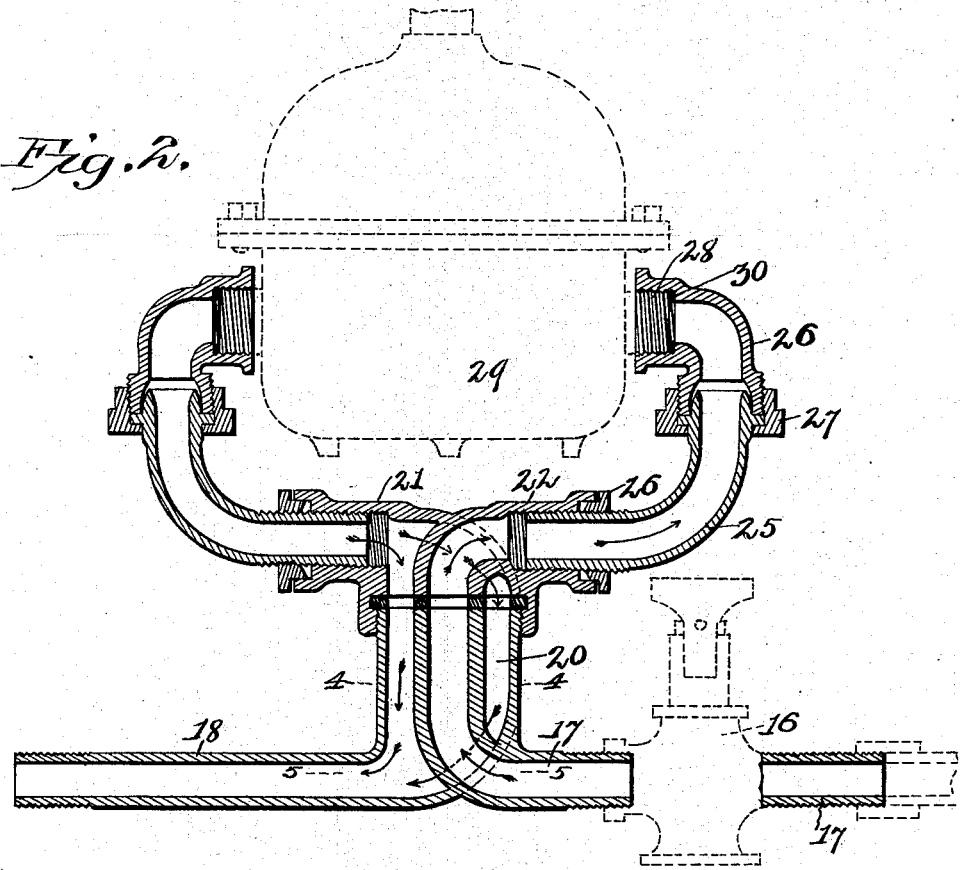
Figure 4:
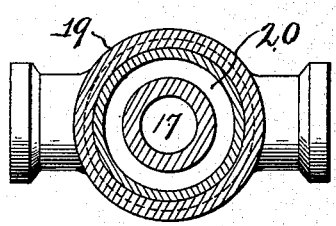
Figure 5:
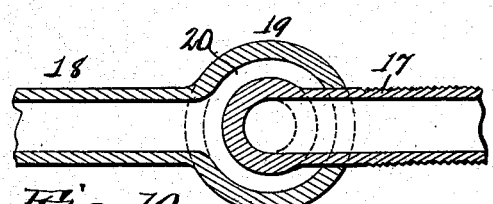
Figure 8:
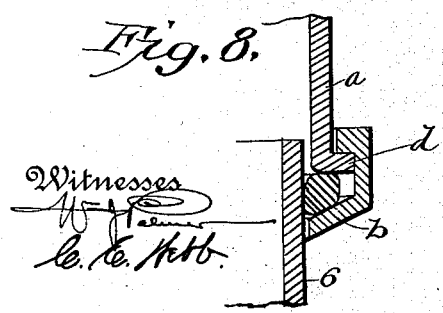
Figure 10:
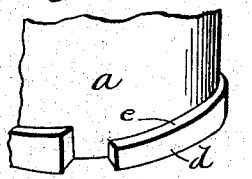

Figure 1 is a central vertical section of a meter-box, showing the meter and its connections in elevation applied to the box. Fig. 2 is a sectional view of the meter connections. Fig. 3 is a top plan view of the meter connections, &c., applied to the casing. Fig. 4 is a sectional view on the line 4 4 of Fig. 1. Fig. 5 is a sectional view on the line 5 5 of Fig. 1. Fig. 6 is a perspective view of one of the gaskets. Fig. 7 is a sectional view of the cap for use when the meter is dispensed with. Fig. 8 is a sectional view showing a modified connection for securing the telescopic section of the meter-casing to the central section thereof. Fig. 9 is a perspective view of a fragment of the securing-ring inverted. Fig. 10 is a perspective view of a fragment of the upper section of the casing, showing the flanges with cam-surfaces for engaging lugs of the ring.

In the drawings, 1 denotes the base of the meter-box, having apertures 2 3 for the supply and service pipe connections, and an annular flange 4, corresponding with the flange 5, formed on the bottom of the middle section 6 of the meter-box. A ring $b$ is provided to embrace the section 6 of the meter-box, said ring being provided with inwardly-extending lugs $c$, which are adapted to engage and ride on the inclined edges $e$ of the flanges $d$, secured on the outer surface of the upper section $a$ of the meter-box. The top section can be adjusted so as to increase the length of the box, as will be understood, is cylindrical, and is provided with an internal flange 10 near the top.

The lid or cover 11 of the box is adapted to rest on the flange 10, and it is held thereon against displacement by locking-levers 12. The locking-levers are pivoted to lugs 13, depending from the cover, and the inner ends of said levers extend nearly to the center of the cover. The upper edges of the inner ends of the levers are beveled and are engaged by the conical end of a screw 14, threaded in the top, and the outer ends of the levers are adapted to engage the under surface of the flange 10 when the screw is run down to the position shown in Fig. 1. By an inspection of the drawings it will be observed that by backing off the bolt the outer ends of the levers will be allowed to descend out of engagement with the flange, thus permitting the removal of the cover. The upper surface of the top is recessed, as at 15, to receive the head of the lever-controlling bolt.

A curb-cock 16 is interposed in the supply-pipe 17, said curb-cock being located within the casing. The supply-pipe 17 and the service-pipe 18 extend through the wall of the lower section of the casing when they are connected to the underground extensions. The supply and service pipes merge into a double coupling 19, the said supply-pipe extending upward centrally of the coupling and the service-pipe being in communication with the annular space 20, as shown by the arrows in Fig. 2.

The coupling comprises an upper and lower member joined by threads, the said upper member having an annular passage in communication with the leg 21 of the upper member, and the inner or supply pipe being in communication with the leg 22 of said upper member. A gasket 23 is interposed between the meeting ends of the members and has holes therein to correspond with the outer and inner passages of the coupling. The end of each leg of the upper section of the coupling is internally threaded for the reception of the ends of the curved pipes 25, and it is my object to have the lower ends of said pipes so threaded as to allow for their adjustment to meters of varying widths. A jam-nut 26 is provided on each pipe 25 for locking the parts in their adjusted position. The upper ends of the pipes 25 are convexed on their outer edges to form bearings for the elbows 26ª, which are concaved on their inner surfaces. Nuts 27 are employed for binding the ends of the pipes and elbows together. The elbows at the upper end are threaded to the nipples 28 of the meter 29, and gaskets 30 are interposed between the ends of the nipples and shoulders of the elbows.

The meter is provided with an extension-bar, on which is mounted the meter-dial, so that the condition of the meter can be taken from the surface of the ground.

As shown in Fig. 8, the upper portion $a$ of the casing is fitted on the outside of the central portion of the casing. A ring $b$, approximately L shape in cross-section, embraces the central section of the casing and has inturned lugs $c$. The upper section of the casing has external flanges $d$ with cam edges $e$, said flanges being separated. In fastening the upper section in place the upper section is passed over the central section after the ring has been applied to said central section. The lugs of the ring register with the spaces between the flanges of the upper section, and as the upper surfaces of the flanges pass below the lugs the upper section is partially rotated, and owing to the cam action the lower edge of the upper section is more and more depressed in the ring. A packing $f$, lying in the ring against the central section of the meter-casing, is compressed by the downward movement of the edge of the upper section in the ring, and thus a water-tight but yielding joint is formed. The yielding action is provided and very desirable in case of expansion due to frost or other causes.

The nature of the invention can readily be ascertained from the foregoing, and it will be understood that I do not wish to limit myself to the specific structure or proportions described, as the arrangement of details for successfully carrying my invention into practice may be variously modified to meet particular requirements or circumstances, as will be obvious to those skilled in the art.

Having thus fully described my invention, what I claim as new, and desire to secure by Letters Patent, is—

1. In combination with a meter-box and its cover, locking-levers pivoted to the cover and having beveled inner ends and a screw threaded through the top and engaging the levers.

2. In combination, a meter, elbows connected to the meter, said elbows having their ends remote from the meter and concaved internally, pipes joined to the elbows having their ends convexed, nuts for adjusting and binding the ends together, a meter connection comprising an upper and lower section having a central passage and an annular passage therearound, said upper section of the meter connection having legs to which the pipes are adjustably secured, and jam-nut for binding the pipes in their adjusted position.

3. In a connection for meter-casings, an upper telescopic section fitted over the stationary section and having external flanges with cam-surfaces, a ring approximately L-shaped in cross-section to receive the lower end of the telescopic section having inturned lugs riding on the cam-surfaces of the flanges and packing below the edge of the ring compressed by the action of the ring and edge of the telescopic section, and adapted to bear against the central section of the casing.

4. A meter-box comprising a base, having an annular flange at the top, a middle section having a flange corresponding to the flange of the base; said base and middle section being connected by bolts passing through the said flanges, a top telescopically fitted to the middle section and having an internal flange near the top, a cover resting on the flange, locking-levers pivoted to the cover and having beveled inner ends and a screw threaded through the top and engaging the levers.

5. In combination, a casing, a meter having nipples suitably placed, a supply-pipe and a service-pipe passing through the wall of the lower section of the casing, said supply and service pipes merging into a double coupling, said supply-pipe extending upward centrally of the coupling and the service-pipe being in communication with the annular space formed around the supply-pipe, legs formed on the upper portion of the coupling and adjustable curved pipes communicating between the nipples of the meter and the legs of the coupling.

6. In combination, a casing, a meter, a supply-pipe and a service-pipe passing through the wall of the lower section of the casing, said supply-pipe and service-pipe merging into a double coupling of two sections, said supply-pipe extending upward centrally of the lower section of the coupling and connecting with a corresponding pipe in the upper section, said pipe in the upper section being in communication with a leg of said upper section, said service-pipe being in communication with the annular space around the supply-pipe, said annular space being in communication with another leg of the upper section of the coupling, a connection between the legs of the coupling and the meter, and a gasket between the meeting ends of the sections of the couplings having holes therein corresponding with the outer and inner passages of the coupling.

7. In combination, a meter-box having an internal flange near the top, a cover resting on said flange, locking-levers pivoted to the cover adapted to engage the under surface of the internal flange of the meter-box and having beveled inner ends and a screw threaded through the cover engaging the levers.

8. In combination, a meter-box comprising a base, a middle section rigidly secured to the base, and a top section telescopically fitted to the middle section, said top section having its lower edge beveled and a flange having its upper edge inclined secured on its outer surface, a ring adapted to embrace the middle section, said ring being approximately L-shaped in cross-section and being provided with inwardly-projecting lugs adapted to engage and ride on the inclined edge of the flange of the top section of the meter-casing, a cover for said top section, locking-levers pivoted to the cover and having beveled inner ends, a screw threaded through the top and engaging the levers, a meter, a meter connection, said connection comprising an upper and lower section having a central passage and an annular passage therearound, said upper section having legs, elbows connected to the meter, said elbows having their ends remote from the meter and concaved internally, pipes joined to the elbows and having their opposite ends secured to the legs of the upper section of the coupling, nuts for adjusting and binding the ends together, and a curb-cock, all arranged in the meter-box as and for the purpose set forth.

In testimony whereof I affix my signature in the presence of two witnesses.

H. V. ESTILL.

Witnesses:
B. S. HEAD,
H. A. MARTIN.